United States Patent
Ogawa et al.

(10) Patent No.: US 9,926,962 B2
(45) Date of Patent: Mar. 27, 2018

(54) SELF-TAPPING SCREW AND METHOD OF MANUFACTURING THE SAME

(71) Applicant: CROWN SCREW CORPORATION, Saitama (JP)

(72) Inventors: Nobuhiro Ogawa, Saitama (JP); Naoki Yokoyama, Saitama (JP)

(73) Assignee: CROWN SCREW CORPORATION, Saitama (JP)

(*) Notice: Subject to any disclaimer, the term of this patent is extended or adjusted under 35 U.S.C. 154(b) by 0 days.

(21) Appl. No.: 14/948,784

(22) Filed: Nov. 23, 2015

(65) Prior Publication Data
US 2016/0258467 A1 Sep. 8, 2016

(30) Foreign Application Priority Data
Mar. 2, 2015 (JP) .................................. 2015-40298

(51) Int. Cl.
*F16B 25/00* (2006.01)
*B21H 3/02* (2006.01)

(52) U.S. Cl.
CPC ......... *F16B 25/0052* (2013.01); *B21H 3/027* (2013.01); *F16B 25/00* (2013.01); *F16B 25/0047* (2013.01)

(58) Field of Classification Search
CPC .. F16B 25/00; F16B 25/0047; F16B 25/0052; F16B 25/103; B21H 3/027; A61B 17/863
USPC .............................. 411/386, 387.4, 417, 426
See application file for complete search history.

(56) References Cited

U.S. PATENT DOCUMENTS

| | | | | |
|---|---|---|---|---|
| 3,180,126 A | * | 4/1965 | Carlson | B21H 3/027 411/394 |
| 3,218,905 A | * | 11/1965 | Reiland | B21H 3/027 411/417 |
| 3,469,491 A | * | 9/1969 | Munsey | F16B 25/0057 411/422 |
| 3,894,570 A | * | 7/1975 | Reynolds | B21H 3/027 118/621 |
| 3,935,785 A | * | 2/1976 | Lathom | F16B 25/0047 411/413 |
| 4,818,165 A | * | 4/1989 | Shirai | F16B 25/0021 408/217 |
| 4,844,676 A | * | 7/1989 | Adamek | F16B 25/0021 411/386 |
| 4,973,209 A | * | 11/1990 | Essom | F16B 33/02 411/308 |

(Continued)

FOREIGN PATENT DOCUMENTS

| | | |
|---|---|---|
| JP | 61-79014 | 5/1986 |
| JP | 7-38724 | 7/1995 |

(Continued)

*Primary Examiner* — Roberta S Delisle
(74) *Attorney, Agent, or Firm* — Wenderoth, Lind & Ponack, L.L.P.

(57) ABSTRACT

A self-tapping screw includes a head and a shank extending from the head. The shank includes a cylindrical shank immediately below the head and a truncated conical shank following an end of the cylindrical shank. The cylindrical shank is provided with a plurality of first external threads, the truncated conical shank is provided with a plurality of second external threads following the first external threads, and a peak of each of the second external threads is provided with a biting surface having a concave-convex form.

2 Claims, 7 Drawing Sheets

(56) References Cited

U.S. PATENT DOCUMENTS

| | | | | |
|---|---|---|---|---|
| 5,141,376 A | * | 8/1992 | Williams | F16B 25/0021 411/387.4 |
| 5,211,520 A | * | 5/1993 | McKinney | F16B 25/0078 411/304 |
| 5,340,254 A | * | 8/1994 | Hertel | F16B 25/0021 411/311 |
| 5,599,149 A | * | 2/1997 | Clemente | F16B 25/0031 411/386 |
| 5,961,267 A | * | 10/1999 | Goss | B21H 3/027 411/386 |
| 5,964,560 A | * | 10/1999 | Henriksen | F16B 25/0031 411/386 |
| 7,021,877 B2 | * | 4/2006 | Birkelbach | F16B 25/0047 411/412 |
| 7,959,393 B2 | * | 6/2011 | Ambros | F16B 25/0005 411/386 |
| 2006/0039775 A1 | * | 2/2006 | Mizuno | F16B 25/0021 411/387.4 |
| 2007/0269288 A1 | * | 11/2007 | Palm | F16B 25/0021 411/386 |
| 2007/0297873 A1 | * | 12/2007 | Wieser | F16B 1/0071 411/411 |

FOREIGN PATENT DOCUMENTS

| | | |
|---|---|---|
| JP | 3338649 | 8/2002 |
| JP | 2013-238282 | 11/2013 |

\* cited by examiner

SELF-TAPPING SCREW AND METHOD OF MANUFACTURING THE SAME

BACKGROUND OF THE INVENTION

1. Technical Field

The present invention relates to a self-tapping screw provided with an external thread for plastically forming an internal thread on the inner peripheral surface of a pilot hole.

2. Description of the Related Art

At the beginning of screwing, such a self-tapping screw forces its external thread, which first makes contact with the inner peripheral surface of a pilot hole with no internal thread, to bite into the inner peripheral surface so that the self-tapping screw guides a subsequent external thread smoothly while maintaining screwing attitude thereof and plastically forms an internal thread on the inner peripheral surface of the pilot hole.

JP 3338649 B1 discloses a self-tapping screw whose shank is formed to transition from a circular cross-section to an equilateral triangle cross-section as it goes from a portion immediately below a head to an end portion, whose external thread peak formed on the outer peripheral surface in an end side of the shank with the equilateral triangle cross-section is formed to be a flat surface shape whose completeness decreases moving toward a shank end, and which improves biting performance at the beginning of screwing by using the external thread having the flat surface-shaped peak and maintains screwing attitude.

In the self-tapping screw disclosed in JP 3338649 B1, however, the external thread having the flat surface-shaped peak that first makes contact with the inner peripheral surface of a pilot hole are not raised enough to be referred to as a "male thread" and it is simply a band shape that is raised to slightly increase the outer diameter of the shank end. As such, while initial biting performance is improved, its effect is limited.

As described above, such a flat surface-shaped peak may be unable to plastically form a suitable internal thread and to guide a subsequent external thread smoothly.

In addition, the external thread having the flat surface-shaped peak is formed on the outer periphery of the shank with the equilateral triangle cross-section so that only external thread portions at the vertices of the equilateral triangle contributes to plastic forming to form the internal thread. Also in this regard, a suitable internal thread may not be formed by plastic forming.

SUMMARY OF THE INVENTION

The present invention is to provide a self-tapping screw and a method of manufacturing the same that efficiently solve the problems of a conventional self-tapping screw described above and improve initial biting performance.

Briefly, a self-tapping screw according to the present invention includes a head and a shank extending from the head; the shank includes a cylindrical shank immediately below the head and a truncated conical shank following an end of the cylindrical shank; the cylindrical shank is provided with a plurality of first external threads; the truncated conical shank is provided with a plurality of second external threads following the first external threads; a peak of each of the second external threads is provided with a biting surface having a concave-convex form; and the biting surface is structured to bite into the inner peripheral surface of a pilot hole, whereby the initial biting performance is improved by the biting surface and an appropriate screwing attitude is maintained.

The self-tapping screw is preferably structured such that a plurality of first external threads formed on an end portion of the cylindrical shank are provided with a plurality of no-thread parts at regular intervals in a circumferential direction and a plurality of second external threads formed on the truncated conical shank are provided with a plurality of no-thread parts at regular intervals in a circumferential direction, whereby both the no-thread parts reduce an initial torque without degrading the initial biting performance of the biting surface and guide subsequent external threads smoothly, allowing for smooth plastic forming to form internal threads.

There is also provided a method of manufacturing the self-tapping screw according to the present invention that includes the head and the shank extending from the head and is configured such that the shank includes the cylindrical shank immediately below the head and the truncated conical shank following the end of the cylindrical shank, the cylindrical shank is provided with the plurality of first external threads, the truncated conical shank is provided with the plurality of second external threads following the first external threads, and the peak of each of the second external threads is provided with the biting surface having the concave-convex form. The method of manufacturing the self-tapping screw, which includes the following steps A to D, forms the second external threads easily and properly.

A) forming a blank provided with a shank including a cylindrical shank and a truncated conical shank, B) forming, on each of opposing rolling surfaces of a pair of rolling die plates, a vertical surface and an inclined surface that follows a lower end of the vertical surface and is inclined so as to narrow a gap with the other opposing rolling surface, C) setting a taper angle of the inclined surface of the rolling surface to be smaller than a taper angle of the truncated conical shank of the blank, and D) carrying out rolling with the inclined surfaces of the rolling surfaces in contact with an external thread starting point position on the outer peripheral surface of the truncated conical shank between the rolling surfaces of the pair of rolling die plates and forming the first external threads and the second external threads with the biting surface by rolling.

Preferably, the blank is provided with a plurality of flat portions spanning the cylindrical shank and the truncated conical shank at regular intervals in the circumferential direction. The flat portions are used to form a plurality of no-thread parts on a plurality of first external threads on the end portion of the cylindrical shank at regular intervals in the circumferential direction and to form a plurality of no-thread parts on the plurality of second external threads on the truncated conical shank at regular intervals in the circumferential direction.

The present invention can provide a self-tapping screw that achieves appropriate initial biting performance using the second external threads with the biting surface at a shank end. The second external threads with the biting surface can be formed so as to be raised properly.

In addition, since the biting surface does not inadvertently damage the inner peripheral surface of a pilot hole, the production of chips may be effectively prevented.

Both of improvement of the initial biting performance and reduction in the initial torque can be achieved by forming a plurality of no-thread parts on the second external threads with the biting surface.

BRIEF DESCRIPTION OF THE DRAWINGS

FIG. 6A illustrates a situation where rolling is started, FIG. 6B illustrates a situation where rolling is carried out, and FIG. 6C illustrates a situation where rolling is completed;

FIG. 9A illustrates a situation where rolling is started and FIG. 9B illustrates a situation where rolling is completed.

DETAILED DESCRIPTION OF THE INVENTION

The best mode of the present invention will now be described with reference to FIG. 1 to FIGS. 9A and 9B.

Figure 1:
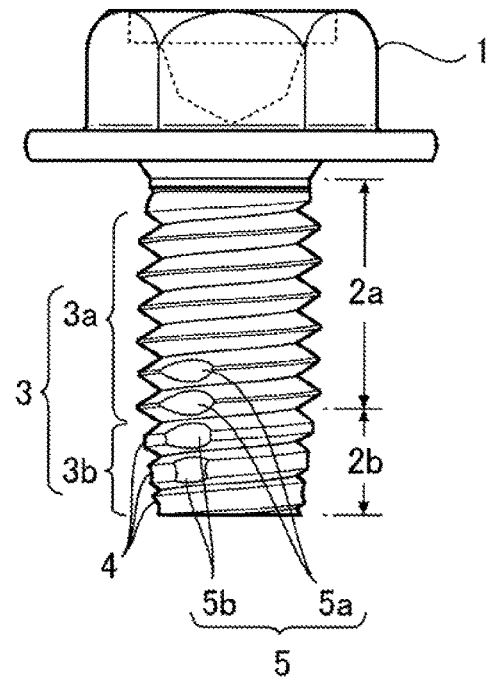
FIG. 1 is a front view of a self-tapping screw according to the present invention.
Figure 2:
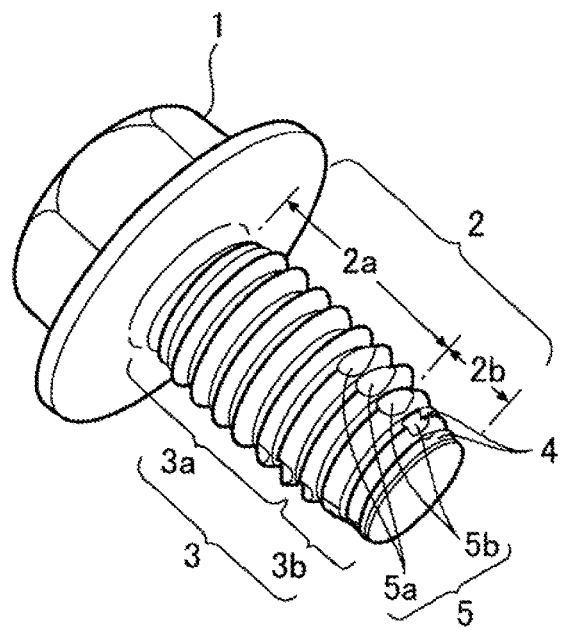
FIG. 2 is a perspective view of the self-tapping screw according to the present invention.

As illustrated in FIGS. 1 and 2, a self-tapping screw according to the invention has a base structure that includes a head 1 with an engagement groove for engaging with the tip of a driver bit and a shank 2 extending from the center of the lower surface of the head 1, the outer peripheral surface of the shank 2 being provided with a single external screw thread 3.

The shank 2 includes a cylindrical shank 2a immediately below the head and a truncated conical shank 2b following an end (i.e. a lower end) of the cylindrical shank 2a. Thus, the shank 2 of the self-tapping screw according to the invention has a circular cross-section perpendicular to the shank 2 that is the same diameter from the proximal end to the distal end thereof in the cylindrical shank 2a and has a circular cross-section perpendicular to the shank 2 that has a smaller diameter moving to the end thereof in the truncated conical shank 2b.

The external screw thread 3 includes a plurality of first external threads 3a formed on the outer peripheral surface of the cylindrical shank 2a and a plurality of second external threads 3b formed on the outer peripheral surface of the truncated conical shank 2b, where the first external threads 3a and the second external threads 3b are continuous.

Figure 3:
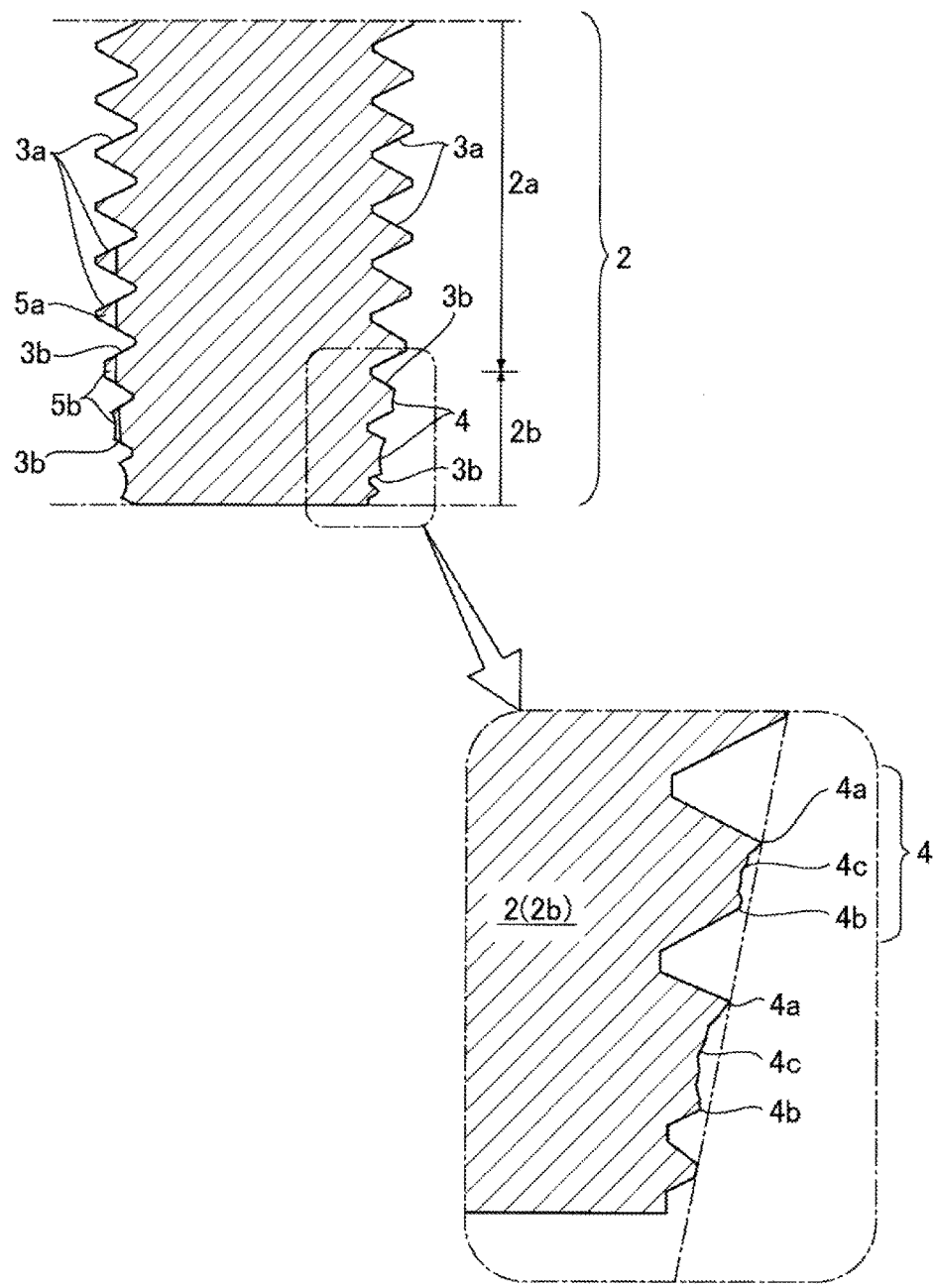
FIG. 3 is an enlarged cross-sectional view of a shank.
Figure 4:
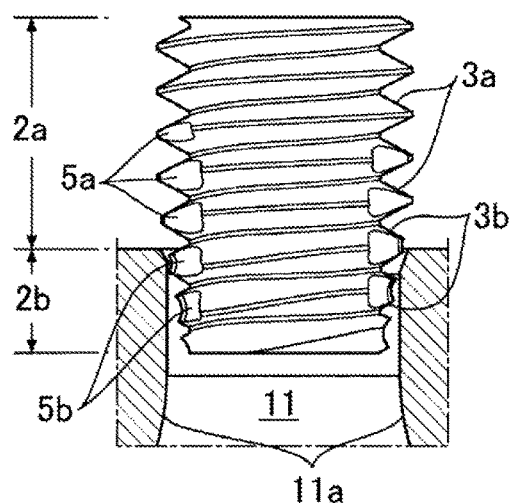
FIG. 4A illustrates engagement of an external thread with the inner peripheral surface of a pilot hole when a shank end is inserted into the inner peripheral surface of the pilot hole.
FIG. 4B illustrates engagement of external threads with the inner peripheral surface of the pilot hole when the shank is rotated by 180 degrees from the position illustrated in FIG. 4A.
FIG. 4C illustrates engagement of external threads with the inner peripheral surface of the pilot hole when the shank is rotated by 360 degrees from the position illustrated in FIG. 4A.
Figure 4:
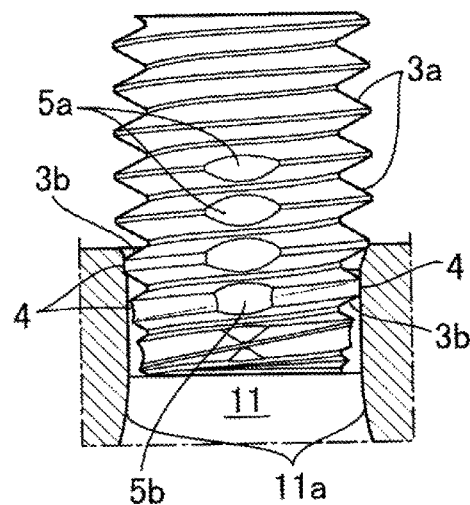
Figure 4:
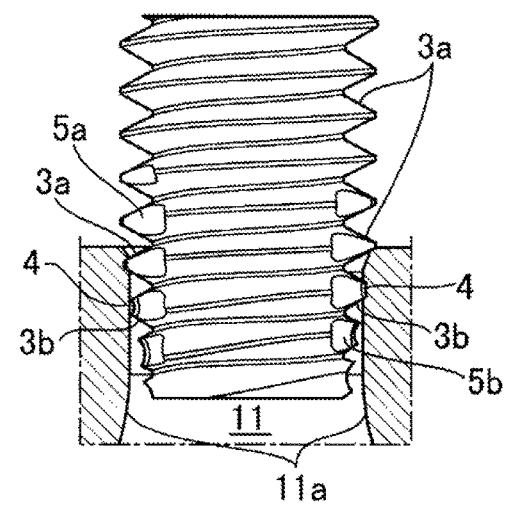

Moreover, a peak of each of the second external threads 3b is provided with a biting surface 4 having a concave-convex form. As illustrated in FIG. 3, the biting surface 4 has an upper convex portion 4a at an upper end and a lower convex portion 4b at a lower end and has a concave portion 4c between the upper convex portion 4a and the lower convex portion 4b, where the concave portion 4c also has a rough surface with micro-irregularities, thereby contributing to the improvement of the initial biting performance and preventing or reducing the production of chips by plastically deforming the inner peripheral surface of a pilot hole properly. The upper convex portion 4a protrudes slightly outside of the lower convex portion 4b.

Preferably, the second external thread 3b is formed such that its height is reduced toward the end of the truncated conical shank 2b, and projecting heights of the upper convex portion 4a and the lower convex portion 4b of the biting surface 4 on the peak of the second external thread 3b is also formed to be reduced toward the end thereof, thereby improving initial biting performance as well as reducing initial torque.

Also, as illustrated in FIGS. 1 and 2, a plurality of first external threads 3a formed on the end portion of the cylindrical shank 2a and a plurality of second external threads 3b formed on the truncated conical shank 2b are provided with a plurality of no-thread parts 5 at regular intervals in a circumferential direction.

More specifically, the first external threads 3a formed on the end portion of the cylindrical shank 2a are provided, at regular intervals in the circumferential direction, with first no-thread parts 5a where peaks are recessed in a concave curved shape, and the second external threads 3b following the first external threads 3a with the no-thread parts 5a are provided with second no-thread parts 5b where peaks or upper and lower flanks are recessed in a concave curved shape.

The first no-thread parts 5a and the second no-thread parts 5b are formed to be arranged on the same generatrix of the shank 2 with the same circumferential spacing between the first no-thread parts 5a and between the second no-thread parts 5b. This embodiment illustrates that three first no-thread parts 5a are formed at 120 degree intervals for a first external thread 3a, and likewise, three second no-thread parts 5b are formed at 120 degree intervals for a second external thread 3b.

The second no-thread parts 5b prevent an increase in the initial torque due to the biting surface 4 of the second external thread 3b, and the first no-thread parts 5a contributes to reduction in screwing torque of the first external threads 3a following the second external threads 3b.

Of the first external threads 3a, a plurality of first external threads 3a other than first external threads 3a with the first no-thread parts 5a are formed to the same thread height on the outer peripheral surface of the cylindrical shank 2a as illustrated in FIGS. 1 to 3 and are screwed following the second external threads 3b and the first external threads 3a with the first no-thread parts 5a. Thus, accurate internal threads are formed by plastic forming. In accordance with some aspects, part of the first external threads 3a other than the first external threads 3a with the first no-thread parts 5a may be optionally provided with a bulging peak protruding slightly outward.

In the following, the initial biting performance into the inner peripheral surface of a pilot hole in using the above-structured self-tapping screw according to the present invention is described.

In use of the above-structured self-tapping screw according to the invention, an end of the shank 2, i.e., an end of the truncated conical shank 2b, is first inserted into an inner peripheral surface 11a of a pilot hole 11, as illustrated in FIG. 4A, and the biting surface 4 at the peak of the second external thread 3b formed on the truncated conical shank 2b engages with the inner peripheral surface 11a of the pilot hole.

That is, a biting surface 4 of any of the second external threads 3b securely bites into the inner peripheral surface 11a of the pilot hole depending on the inner diameter of the inner peripheral surface 11a of the pilot hole, thereby appropriately maintaining the screwing attitude of the self-tapping screw.

At this time, the upper convex portion 4a or both of the upper and lower convex portions 4a, 4b of the biting surface 4 bite into the inner peripheral surface 11a of the pilot hole, part of the material of the inner peripheral surface 11a plastically deformed by the bite makes contact with and engages with the concave portion 4c, and the biting surface 4 including the upper and lower convex portions 4a, 4b and the concave portion 4c bites into the inner peripheral surface 11a of the pilot hole. This prevents the inner peripheral surface 11a of the pilot hole from being inadvertently damaged while achieving appropriate initial biting performance.

As described above, the second external threads 3b are provided with the second no-thread parts 5b, which allow the biting surface 4 to achieve the initial biting performance as well as to reduce the initial torque.

When the self-tapping screw is then rotated and screwed as illustrated in FIGS. 4B and 4C, the second external threads 3b biting into the inner peripheral surface 11a of the pilot hole plastically forms internal threads as well as guides subsequent first external threads 3a into the plastically formed internal threads. In this regard, the first external threads 3a following the second external threads 3b are provided with the first no-thread parts 5a as described above, and the first no-thread parts 5a allow the first external threads 3a to be screwed at low torque.

Thereafter, the first external threads 3a with no first no-thread parts 5a continues to plastically form accurate internal threads, and screwing is completed such that the first external threads 3a are screwed up to the proximal end of the shank 2.

As described above, the self-tapping screw of the invention can not only achieve the initial biting performance through the second external threads 3b, but also does not inadvertently damage the inner peripheral surface 11a of the pilot hole, thereby preventing or reducing the production of chips. The self-tapping screw guides the subsequent first external threads 3a while roughly machining the internal threads using the second external threads 3b, and the first external threads 3a plastically forms accurate internal threads.

A method of manufacturing the above-structured self-tapping screw according to the present invention will now be described.

Figure 5:
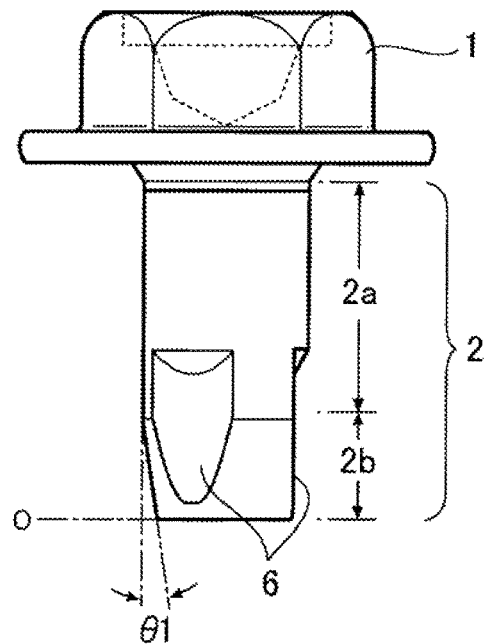
FIG. 5A is a front view of a blank (i.e., a screw material)
FIG. 5B is a bottom view of the blank.
Figure 5:
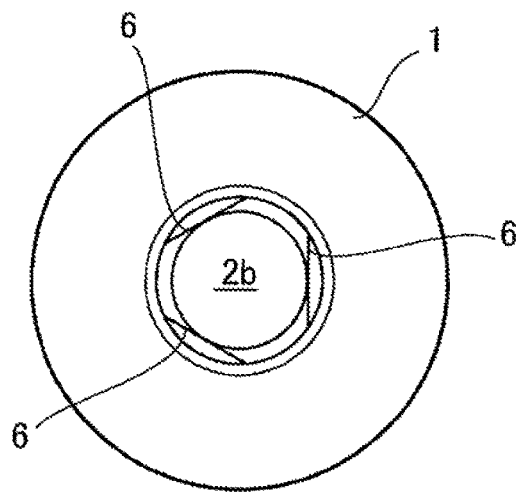

FIG. 5 illustrates a blank from which a screw is made. The blank includes a head 1 with an engagement groove for engaging with the tip of a driver bit and a shank 2 extending from the center of the lower surface of the head 1, and the shank 2 is formed to have a structure including a cylindrical shank 2a immediately below the head 1 and a truncated conical shank 2b following an end of the cylindrical shank 2a. The blank is formed by known heading method.

In FIG. 5A, $\theta 1$ represents a taper angle of the truncated conical shank 2b, and O represents an external thread starting point position, i.e., a level at which the external screw thread 3 (second external thread 3b) starts on the outer peripheral surface of the truncated conical shank 2b. The external thread starting point position O is not necessarily located at an end of the outer peripheral surface of the truncated conical shank 2b and it may be optionally provided at the middle portion of the outer peripheral surface in accordance with some aspects.

A portion spanning the cylindrical shank 2a and the truncated conical shank 2b, i.e., a portion spanning a distal end side (lower side) of the cylindrical shank 2a and a proximal end side (upper side) of the truncated conical shank 2b is provided with a plurality of flat portions 6 for forming the no-thread parts 5 at regular intervals in the circumferential direction. The width, area, or number of the flat portions 6 is appropriately adjusted based on the size, shape, and number of desired no-thread parts 5.

Figure 6:
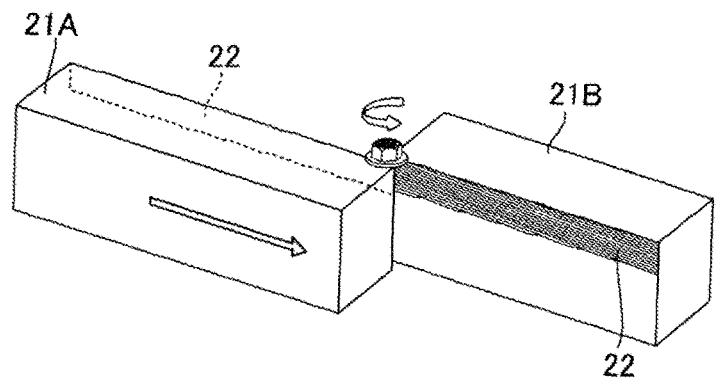
FIGS. 6A to 6C illustrate situations where the external thread is made by rolling with the shank of the blank sandwiched between a pair of rolling die plates, where
Figure 6:
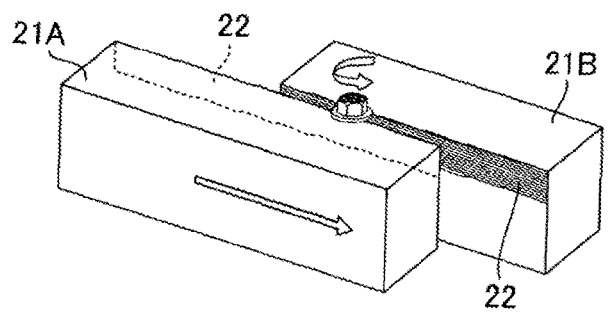
Figure 6:
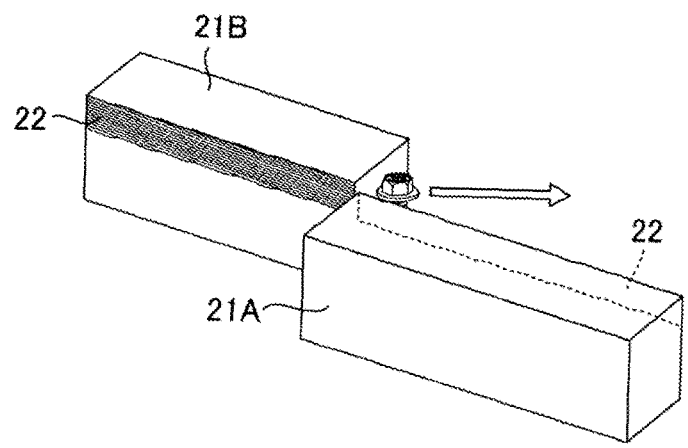

In the present invention, the single external screw thread 3 is formed by rolling on the outer peripheral surface of the shank 2 (cylindrical shank 2a and truncated conical shank 2b). That is, as illustrated in FIG. 6, a pair of rolling die plates 21A, 21B mounted on a rolling machine forms the external screw thread 3 on the outer peripheral surface of the shank 2 by rolling the shank 2 of the blank between rolling surfaces 22 of the rolling die plates 21A, 21B.

More specifically, one die plate 21A is referred to as a moving-side die plate and the other die plate 21B is referred to as a fixed-side die plate. As illustrated in FIG. 6A, a left end of the rolling surface 22 of the fixed-side die plate 21B is opposite to a right end of the rolling surface 22 of the moving-side die plate 21A, and the opposite rolling surfaces 22 hold the shank 2 of the blank therebetween. Then, as illustrated in FIG. 6B, a blank material on the outer peripheral surface of the shank 2 is plastically deformed to form the external screw thread 3 on the outer peripheral surface of the shank 2 by moving the moving-side die plate 21A in the right direction. Subsequently, as illustrated in FIG. 6C, rolling is completed when the rolling surface 22 of the moving-side die plate 21A has passed the right end of the fixed-side die plate 21B.

Figure 7:
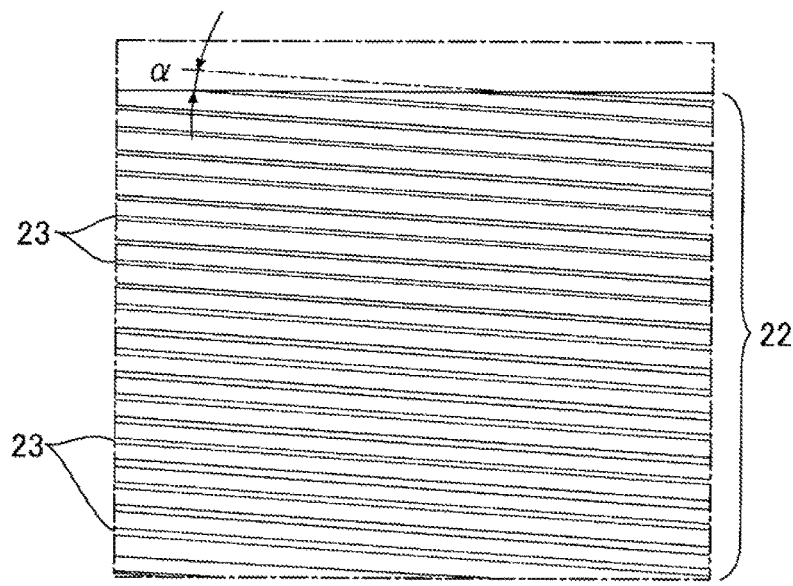
FIG. 7 is an enlarged surface view of a rolling surface of the rolling die plate.

The rolling surfaces 22 of both the pair of rolling die plates 21A, 21B are provided with multiple grooves 23 for forming external threads as illustrated in FIG. 7, where the grooves 23 are inclined at a lead angle α. A desired external screw thread 3 is formed on the shank 2 of the blank by adjusting the width, depth, spacing, etc. of the grooves 23.

Figure 8:
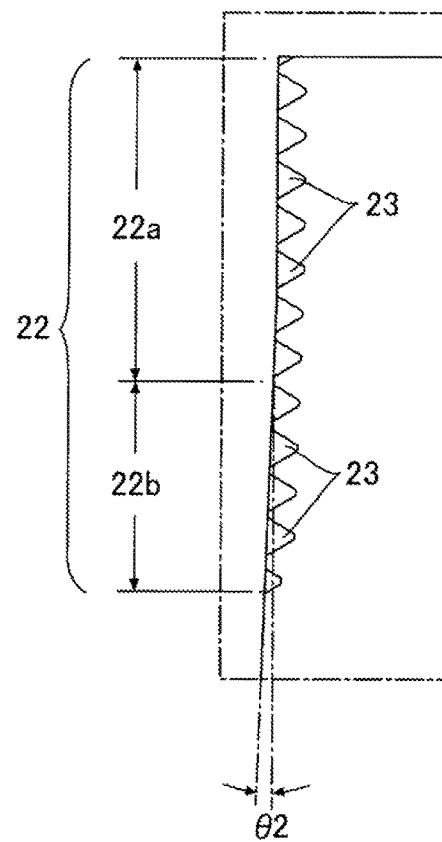
FIG. 8 is an enlarged sectional view of the rolling surface of the rolling die plate.
Figure 9:
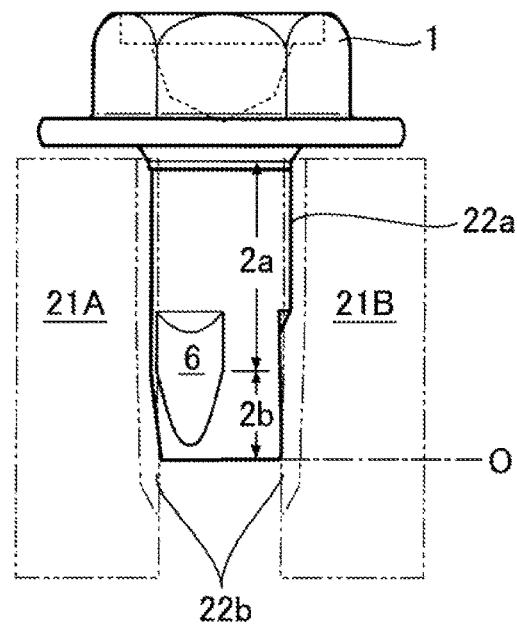
FIGS. 9A and 9B illustrate a relationship between the blank and the pair of rolling die plates, where
Figure 9:
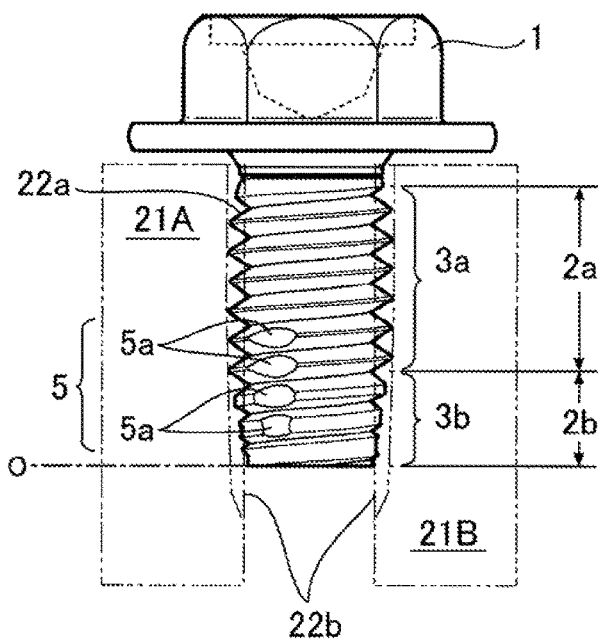

In the present invention, as illustrated in FIG. 8, the rolling surface 22 is provided with a vertical surface 22a and an inclined surface 22b that follows a lower end of the vertical surface 22a and is inclined so as to narrow a gap with the other opposing rolling surface 22.

A taper angle $\theta 2$ of the inclined surface 22b is set to be smaller than the above-described taper angle $\theta 1$ of the truncated conical shank 2b of the blank. A vertical length of the inclined surface 22b is appropriately adjusted so that the inclined surface 22b can make contact with the external thread starting point position O on the outer peripheral surface of the truncated conical shank 2b.

Thus, as illustrated in FIG. 9A, rolling is started with the inclined surface 22b of each rolling surface 22 in contact with the external thread starting point position O on the outer peripheral surface of the truncated conical shank 2b of the blank.

When rolling is carried out in such a way as described with reference to FIGS. 6A-6C, the blank material on the periphery of the truncated conical shank 2b in the upper level than the external thread starting point position O is plastically deformed to form the second external threads 3b, as illustrated in FIG. 9B, and the blank material on the periphery of the cylindrical shank 2a is plastically deformed to form the first external threads 3a.

Since the taper angle θ2 of the inclined surface 22b is smaller than the taper angle θ1 of the truncated conical shank 2b, the pressure that the peripheral surface of the truncated conical shank 2b receives from the inclined surface 22b gradually decreases toward the end of the truncated conical shank 2b and, on the farther end of the truncated conical shank 2b, the grooves 23 for forming the external thread is filled with less blank material in rolling. Thus, the second external thread 3b is formed that has the biting surface 4 with the above-described concave-convex form, i.e., the biting surface 4 that is formed, as illustrated in FIG. 3, to have the upper convex portion 4a at the upper end, the lower convex portion 4b at the lower end, and the concave portion 4c between the upper convex portion 4a and the lower convex portion 4b, the concave portion 4c being a rough surface with micro-irregularities.

Rolling is carried out with the external thread starting point position O on the outer peripheral surface of the truncated conical shank 2b in contact with the inclined surface 22b of each rolling surface 22 so that the second external thread 3b can be formed by being securely and properly raised from its starting point.

Furthermore, the above-mentioned first and second no-thread parts 5a, 5b are formed at positions corresponding to the flat portions 6 formed on the shank 2 of the blank.

As described above, the self-tapping screw according to the present invention has the biting surface 4 having a concave-convex form on the peak of the second external thread 3b formed on the truncated conical shank 2b in the end side of the shank 2, and the biting surface 4 allows the initial biting performance to be effectively achieved. In addition, the concave-convex form of the biting surface 4 can plastically deform the inner peripheral surface of the pilot hole properly, thereby preventing or reducing the production of chips.

The second no-thread parts 5b formed on the second external threads 3b allow the biting surface 4 to achieve the initial biting performance as well as to reduce the initial torque.

Moreover, the method of manufacturing the self-tapping screw according to the present invention can form the second external threads 3b having the biting surface 4 by properly raising the second external threads 3b.

What is claimed is:

1. A self-tapping screw comprising:
   a head; and
   a shank extending from the head,
   the shank including a cylindrical shank immediately below the head and a truncated conical shank following an end of the cylindrical shank,
   the cylindrical shank being provided with a plurality of first external threads, and a plurality of no-thread parts,
   the truncated conical shank being provided with a plurality of second external threads, and with a plurality of no-thread parts following the first external threads,
   a peak of each of the second external threads being provided with a biting surface having a concave-convex form, wherein
   the biting surface bites into an inner peripheral surface of a pilot hole.

2. The self-tapping screw according to claim 1, wherein
   a plurality of the first external threads, formed on an end portion of the cylindrical shank, are provided with a plurality of the no-thread parts at regular intervals in a circumferential direction, and
   a plurality of the second external threads, formed on the truncated conical shank, are provided with a plurality of the no-thread parts at regular intervals in a circumferential direction.

\* \* \* \* \*